(12) United States Patent
Chang

(10) Patent No.: US 9,247,832 B2
(45) Date of Patent: Feb. 2, 2016

(54) ANTI-THEFT SUSPENSION DEVICE FOR SOCKET

(71) Applicant: CHUN NIEN PLASTIC LTD., Taichung (TW)

(72) Inventor: Chi-Tsai Chang, Taichung (TW)

(73) Assignee: Chun Nien Plastic Ltd., Taichung (TW)

( * ) Notice: Subject to any disclaimer, the term of this patent is extended or adjusted under 35 U.S.C. 154(b) by 80 days.

(21) Appl. No.: 14/163,128

(22) Filed: Jan. 24, 2014

(65) Prior Publication Data

US 2014/0209780 A1  Jul. 31, 2014

(30) Foreign Application Priority Data

Jan. 25, 2013  (TW) .............................. 102201733 U

(51) Int. Cl.
| | |
|---|---|
| *F16M 13/00* | (2006.01) |
| *B65D 73/00* | (2006.01) |
| *A47F 5/00* | (2006.01) |
| *A47F 5/08* | (2006.01) |
| *B25H 3/04* | (2006.01) |

(52) U.S. Cl.
CPC ............. *A47F 5/0823* (2013.01); *A47F 5/0006* (2013.01); *B25H 3/04* (2013.01); *F16M 13/005* (2013.01); *B65D 73/0014* (2013.01); *B65D 73/0064* (2013.01)

(58) Field of Classification Search
CPC .. B25H 3/04; B65D 73/0064; B65D 73/0014; A47F 5/0006; F16M 13/005; Y10S 206/807
USPC .......... 248/551, 552, 553, 314, 689; 206/349, 206/378; 211/4, 8, 70.6
See application file for complete search history.

(56) References Cited

U.S. PATENT DOCUMENTS

| | | | | |
|---|---|---|---|---|
| 5,862,913 | A | * | 1/1999 | Chou ............................ 206/378 |
| 6,415,933 | B1 | * | 7/2002 | Kao ............................. 211/70.6 |
| 7,658,284 | B2 | * | 2/2010 | Lin .............................. 206/378 |
| 8,381,905 | B1 | * | 2/2013 | Kao ............................. 206/378 |
| 8,499,935 | B2 | * | 8/2013 | Hsieh ........................... 206/378 |

* cited by examiner

*Primary Examiner* — Tan Le
(74) *Attorney, Agent, or Firm* — Muncy, Geissler, Olds & Lowe, P.C.

(57) ABSTRACT

An anti-theft suspension device for socket including a main body, a socket holder, and a locking mechanism is provided. The socket holder includes a seat and a receiving member. The seat is disposed on the main body. The receiving member is rotatably disposed on the seat. The receiving member is rotatable between a locking position and a unlock position. The socket holder includes a positioning bump located on one of the seat and the receiving member. When the receiving member is rotated, the positioning bump is alternatively exposed outside the socket holder to buckle the socket or received in the socket holder to release the socket.

5 Claims, 3 Drawing Sheets

ANTI-THEFT SUSPENSION DEVICE FOR SOCKET

BACKGROUND OF THE INVENTION

1. Field of the Invention

The present invention relates to a display device, more especially o an anti-theft suspension device for socket.

2. Description of the Prior Art

Conventional sockets for handtools are displayed for selling by some suspension devices. Specifically, most suspension devices for socket have anti-theft mechanisms to prevent from being stolen.

A conventional socket suspension device has an anti-theft mechanism including an elastic piece. The elastic piece is deformed and disposed in the socket to position the socket. However, to install the socket or to detach the socket, a user has to press the elastic piece, so operation of the suspension device is quite difficult.

SUMMARY OF THE INVENTION

The main object of the present invention is to provide an anti-theft suspension device for socket which is easy to operate.

To achieve the above and other objects, an anti-theft suspension device for socket is provided. The suspension device is adapted for receive a socket having a sleeve hole wherein the inner wall of the sleeve hole is formed with a positioning notch. The suspension device includes a main body, a socket holder, and a locking mechanism.

The socket holder includes a seat and a receiving member. The seat is disposed on the main body. The receiving member is rotatably disposed on the seat and is adapted for the socket to sleeve onto. The receiving member is able to rotate with respect to the seat around a rotation axis between a locking position and an unlocking position. The socket holder has a positioning bump located on one of the seat and the receiving member. When the receiving member is rotated between the locking position and the unlock position, the positioning bump is moved between a first position and a second position. When the positioning bump is located at the first position, the positioning bump is exposed outside the socket holder to be received in the positioning notch of the socket so that the socket is unable to leave the socket holder freely. When the positioning bump is located at the second position, the positioning bump is not exposed outside the socket holder and is not received in the positioning notch of the socket so that the socket is able to leave the socket holder freely. The locking mechanism alternatively inhibits the receiving member from rotating with respect to the seat.

Thereby, position of the positioning bump is able to be alternated by rotating the receiving member between the locking position and the unlock position. The socket is retained when the positioning bump is exposed but is released when the positioning bump is not exposed. In addition, the locking mechanism can alternatively restrict the rotation of the receiving member for anti-theft.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
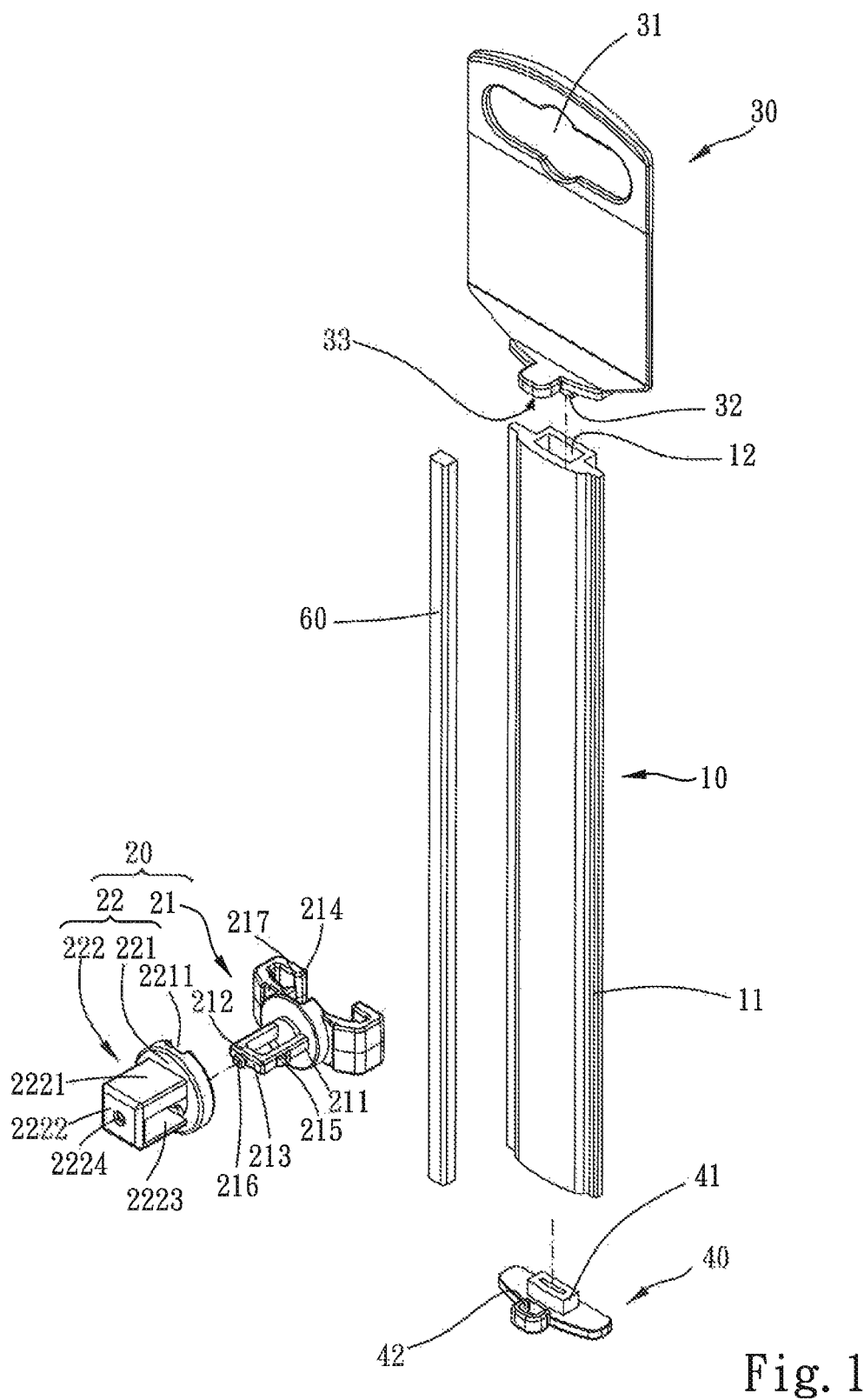
FIG. 1 is a breakdown drawing of the present invention.
Figure 2:
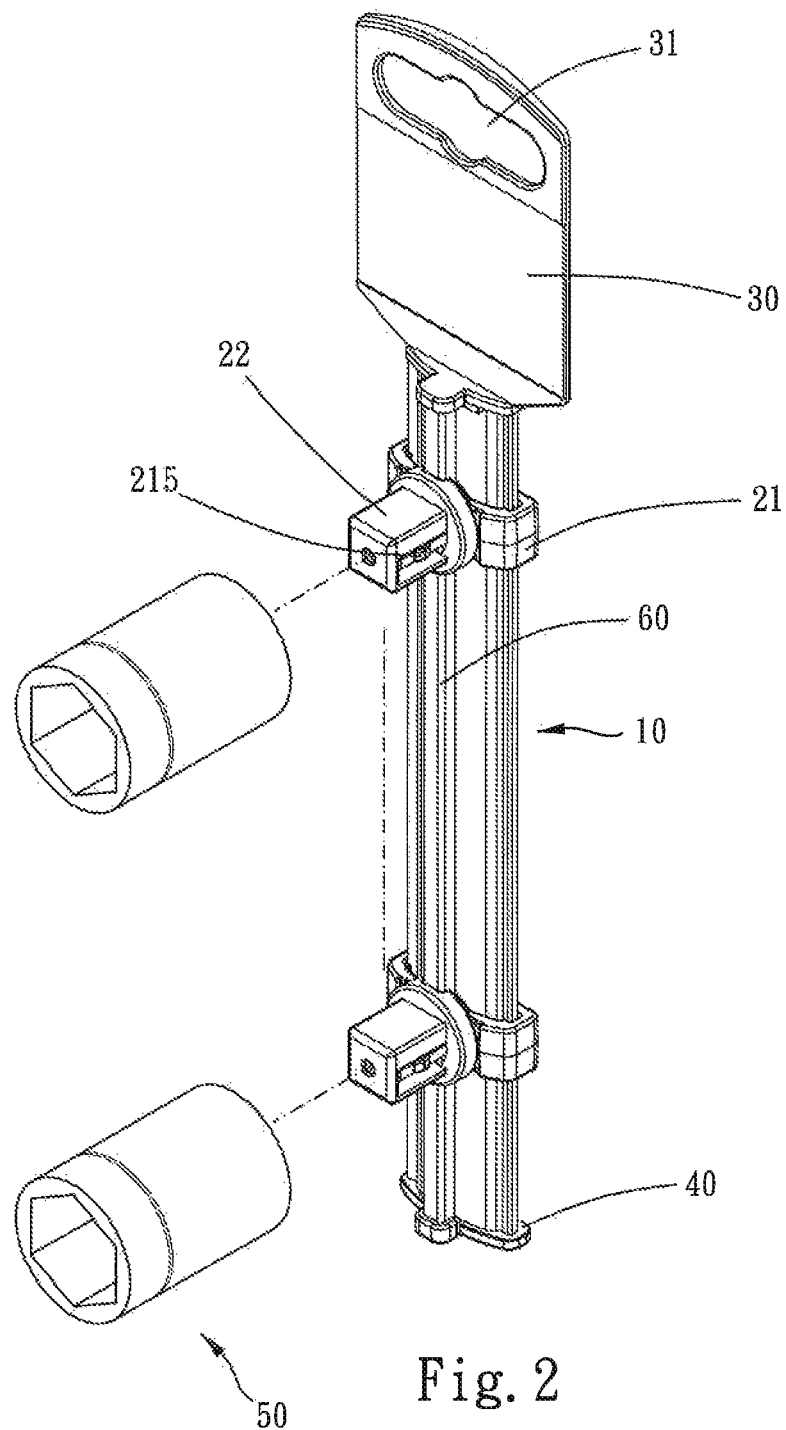
FIG. 2 is a stereogram of the present invention.
Figure 3:
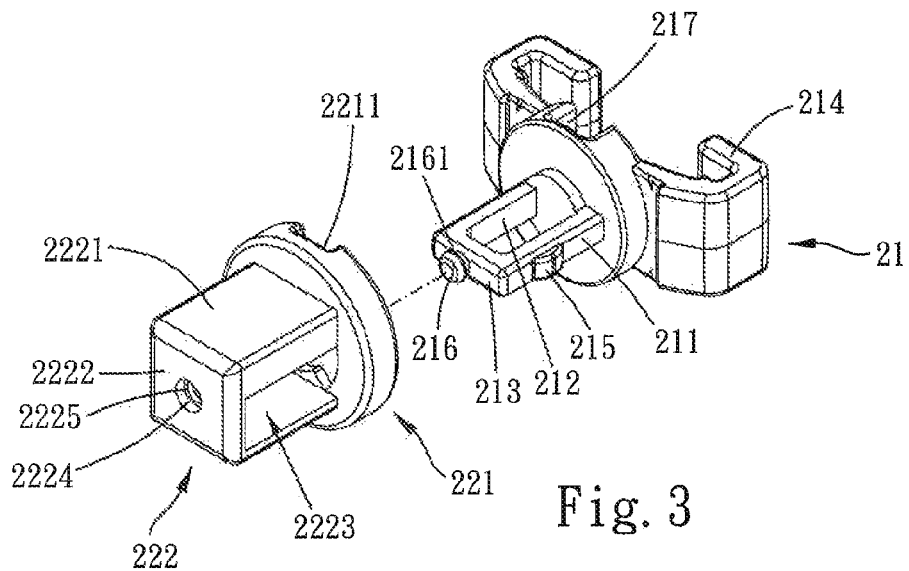
FIG. 3 is a breakdown drawing showing a socket holder of the present invention.
Figure 3A:
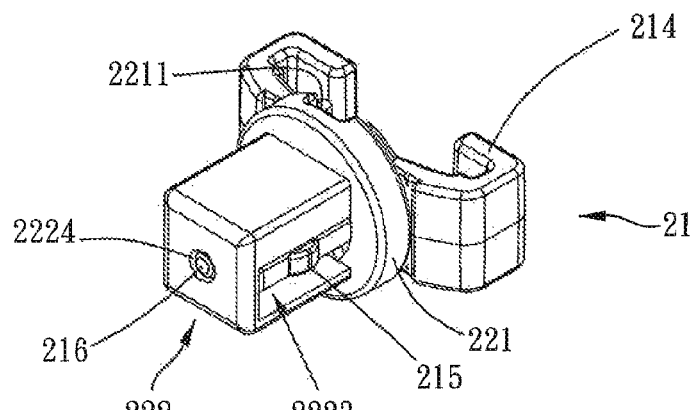
FIG. 3A is a stereogram showing a socket holder of the present invention.
Figure 3B:
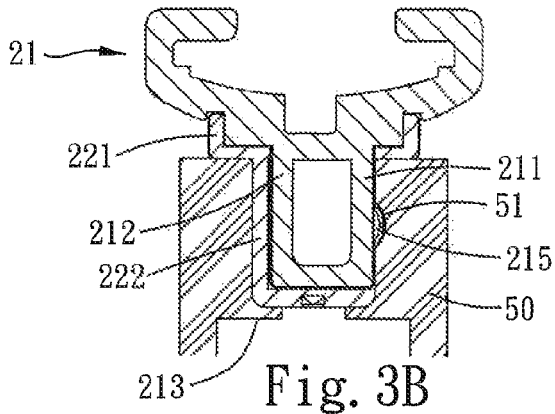
FIG. 3B is a profile of the present invention when a positioning bump is located at a first position.
Figure 3C:
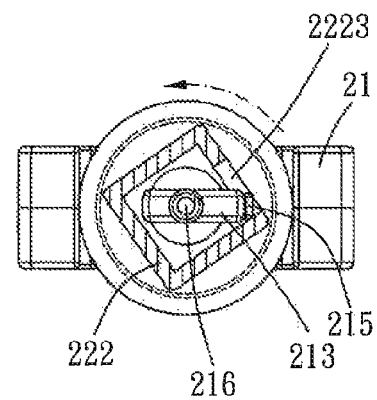
FIG. 3C is a profile of the present invention at another angle when a positioning bump is located at a second position.

Please refer to FIG. 1 to FIG. 3 and FIGS. 3A, 3B, and 3C, an anti-theft suspension device for socket is provided in the present invention. The suspension device is adapted for received a socket 50 having a sleeve hole wherein the inner wall of the sleeve hole is formed with a positioning notch 51. The anti-theft suspension device for socket of the present invention includes a main body 10, a socket holder 20, a locking mechanism, and a limitation mechanism.

The main body 10 is substantially elongated plate-shaped, and a longitudinal direction is defined by the main body 10. Two ends of the main body 10 along the longitudinal direction are connected with a suspension member 30 and a cover 40. Two tracks 11 are formed at two sides of the main body 10 along a width direction. More specifically, two ends of the main body 10 along the longitudinal direction are formed with an insertion hole 12 respectively. The suspension member 30 is formed with a suspension hole 31 at an end and an insertion piece 32 at an opposite end. The cover 40 is also formed with an insertion piece 41. The suspension member 30 and the cover 40 are positioned to the main body 10 by inserting the insertion pieces 32, 41 into the insertion hole 12.

The socket holder 20 includes a seat 21 and a receiving member 22. The seat 21 is disposed on the main body 10. The receiving member 22 is rotatably disposed on the seat 21 and is adapted for being sleeved onto by the socket 50 with its sleeve hole. The receiving member 22 is able to rotate with respect to the seat 21 around a rotation axis between a locking position and a unlock position. The socket holder 20 further includes a positioning bump 215 located on one of the seat 21 and the receiving member 22. When the receiving member 22 is rotated between the locking position and the unlock position, the positioning bump 215 is moved between a first position and a second position. When the positioning bump 215 is located at the first position, the positioning bump 215 is exposed outside the socket holder 20 to buckle the positioning notch 51 of the socket 50 so that the socket 50 is unable to leave the socket holder 20 freely. When the positioning bump 215 is located at the second position, the positioning bump 215 is not exposed and is not received in the positioning notch 51 of the socket 50 so that the socket 50 is free to leave the socket holder 20. In the present embodiment, the seat 21 is formed with two wing pieces 214, and a sliding space is defined between the two wing pieces 214. The two wing pieces 214 are slidably disposed on the two tracks 11 of the main body 10 so that part of the main body 10 is received in the sliding space. The seat 21 is formed with a first plinth piece 211 and a second plinth piece 212 arranged spacedly. The first plinth piece 211 and the second plinth piece 212 are connected by a connecting piece 213 to be substantially U-shaped. The positioning bump 215 is protrudingly formed on a face of the first plinth piece 211 opposite to the second plinth piece 212. The receiving member 22 includes a base 221 and a shelter 222. The base 221 is rotatably disposed on the seat 21, and the shelter 222 is adapted for receiving the first plinth piece 211, the second plinth piece 212, and the connecting piece 213. The shelter 222 includes a plurality of lateral walls 2221 and a top wall 2222. One of the lateral walls 2221 is formed with an opening 2223. When the positioning bump 215 is located at the first position, the positioning bump 215 is exposed via the opening 2223 to buckle the positioning notch 51 of the socket 50. When the positioning bump 215 is located at the second position, the positioning bump 215 is deviated from the opening 2223 and is located inside the shelter 222. More specifically, the shelter 222 has four lateral walls 2221 to be cuboid-shaped. The top wall 2222 of the shelter 222 is substantially square. The rotation axis penetrates the center of the top wall 2222. When the positioning bump 215 is located at the second position, the positioning bump 215 is located between two adjacent lateral walls 2221 and is located on a diagonal line of the shelter 222 so that the positioning bump 215 is received in the shelter 222.

In addition, the top wall 2222 of the shelter 222 is formed with a through slot 2224, and the inner wall of the through slot 2224 is formed with an annular groove 2225. The connecting piece 213 is formed with a protrusion 216 on a face opposite to the seat 21, and the protrusion 216 is formed with an annular rib 2161. The protrusion 216 is inserted through the through slot 2224, and the annular rib 2161 is rotatably received in the annular groove 2225 so that the receiving member 22 is unable to be separated from the seat 21 freely.

The locking mechanism alternatively inhibits the receiving member 22 from rotating with respect to the seat 21. In the present embodiment, the base 221 of the receiving member 22 has a positioning hole 2211, and the seat 21 has a through hole 217. When the receiving member 22 is located at the locking position, the positioning hole 2211 overlaps the through hole 217. The locking mechanism includes a locking stick 60. When the locking stick 60 is inserted through the positioning hole 2211 and the through hole 217, the receiving member 22 is unable to rotate with respect to the seat 21 and is positioned at the locking position. The limitation mechanism is detachably disposed on the main body 10 to position the locking stick 60 to inhibit the locking stick 60 from leaving the main body 10. More specifically, the suspension member 30 and the cover 40 are formed with limitation grooves 33, 42 at the faces toward each other. Two opposite ends of the locking stick 60 are inserted into the limitation grooves 33, 42 respectively so that the locking stick 60 is restricted between the suspension member 30 and the cover 40. To release the locking stick 60, at least one of the suspension member 30 and the cover 40 has to be detached from the main body 10.

In use, the locking stick 60 is separated from the socket holder 20 at first. When the receiving member 22 is rotated to the unlock position, the socket 50 is able to be sleeved onto the shelter 222 of the receiving member 22. Thereafter, to position the socket, one can rotate the receiving member 22 to the locking position to make the positioning bump 215 buckle the positioning notch 51 of the socket 50. And then, insert the locking stick 60 through the positioning hole 2211 and the through hole 217 and make the locking stick 60 be restricted between the suspension member 30 and the cover 40, and the operation is completed. As a result, the socket 50 is unable to be detached from the receiving member 22 freely, and the receiving member 22 is kept at the locking position due to the locking stick 60. Furthermore, the locking stick 60 is restricted between the suspension member 30 and the cover 40 so that the locking stick 60 is unable to be detached easily.

To detach the socket 50, one of the suspension member 30 and the cover 40 is detached first to removing the locking stick 60, and the receiving member 22 has to be rotated to the unlock position to make the positioning bump 215 move inward. Thereby, the socket 50 is able to be detached from the receiving member 22.

What is claimed is:

1. An anti-theft suspension device for socket, adapted for receiving a socket having a sleeve hole wherein a positioning notch is formed on an inner wall of the sleeve hole, the anti-theft suspension device for socket including:
    a main body;
    a socket holder, including a seat and a receiving member, the seat being disposed on the main body, the receiving member being rotatably disposed on the seat and being adapted for the socket sleeving onto with the sleeve hole, the receiving member being able to rotate with respect to the seat around a rotation axis between a locking position and an unlock position, the socket holder further including a positioning bump located on one of the seat and the receiving member, when the receiving member is rotated between the locking position and the unlock position, the positioning bump is moved between a first position and a second position;
    a locking mechanism, alternatively inhibiting the receiving member from rotating with respect to the seat;
    wherein when the positioning bump is located at the first position, the positioning bump is exposed outside the socket holder to be received in the positioning notch of the socket so that the socket is unable to leave the socket holder freely;
    wherein when the positioning bump is located at the second position, the positioning bump is not exposed outside the socket holder and is not received in the positioning notch of the socket so that the socket is able to leave the socket holder freely;
    wherein a first plinth piece and a second plinth piece are formed spacedly from the seat, the first plinth and the second plinth are connected by a connecting piece to be U-shaped, the positioning bump is formed on a face of the first plinth piece opposite to the second plinth piece, the receiving member includes a base and a shelter, the base is rotatably disposed on the seat, the shelter is adapted for receiving the first plinth piece, the second plinth piece, and the connecting piece, the shelter has a plurality of lateral walls and a top wall, an opening is formed on one of the lateral walls, the positioning bump is exposed via the opening to position the socket when the positioning bump is located at the first position, the positioning bump is deviated from the opening and is located in the shelter when the positioning bump is located at the second position;
    wherein the base of the receiving member has a positioning hole, the seat has a through hole, the positioning hole overlaps the through hole when the receiving member is located at the locking position, the locking mechanism includes a locking stick, the receiving member is unable to rotate with respect to the seat and is fixed at the locking position when the locking stick is inserted through the positioning hole and the through hole.

2. The anti-theft suspension device for socket of claim 1, wherein the top wall of the shelter is formed with a through slot, an inner wall of the through slot is formed with an annular groove, the connecting piece has a protrusion at an end opposite to the seat, the protrusion is formed with an annular rib, the protrusion is inserted through the through slot, the annular rib is rotatably received in the annular groove so that the receiving member is unable to be separated from the seat freely.

3. The anti-theft suspension device for socket of claim 1, wherein the shelter has four lateral walls and is substantially cuboid-shaped, the top wall of the shelter is substantially square, the rotation axis penetrates a center of the top wall, when the positioning bump is located at the second position, the positioning bump is located between two adjacent lateral walls and at a diagonal line of the shelter.

4. The anti-theft suspension device for socket of claim 1, wherein the main body is formed with two tracks at two sides, the seat is formed with two wing pieces, a sliding space is defined between the two wing pieces, the two wing pieces are slidably disposed on the two tracks respectively so that part of the main body is received in the sliding space.

5. The anti-theft suspension device for socket of 1, further including a limitation mechanism, the limitation mechanism being detachably disposed on the main body to fix the locking stick so that the locking stick is unable to leave the main body freely.

\* \* \* \* \*